US009058137B2

(12) United States Patent
Amano

(10) Patent No.: US 9,058,137 B2
(45) Date of Patent: Jun. 16, 2015

(54) PRINTING APPARATUS, METHOD FOR CONTROLLING PRINTING APPARATUS, AND STORAGE MEDIUM

(75) Inventor: Hiroyuki Amano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/543,636

(22) Filed: Jul. 6, 2012

(65) Prior Publication Data

US 2013/0016388 A1   Jan. 17, 2013

(30) Foreign Application Priority Data

Jul. 12, 2011 (JP) .................................. 2011-153891

(51) Int. Cl.
*G06K 15/00* (2006.01)
*G06F 3/12* (2006.01)

(52) U.S. Cl.
CPC ............ *G06F 3/1204* (2013.01); *G06F 3/1222* (2013.01); *G06F 3/1238* (2013.01); *G06F 3/1267* (2013.01); *G06F 3/1271* (2013.01); *G06F 3/1288* (2013.01)

(58) Field of Classification Search
CPC ... G06F 3/1222; G06F 3/1238; G06F 21/608; G06F 3/1204; G06F 3/1267; G06F 3/1271; G06F 3/1288; G06F 15/4095; G06K 15/4095; H04N 1/4406
USPC ............ 358/1.1, 1.4, 1.5, 1.6, 1.9, 1.11, 1.12, 358/1.13, 1.14, 1.15, 1.16, 1.17, 1.18
See application file for complete search history.

(56) References Cited

U.S. PATENT DOCUMENTS

| 5,802,260 A | 9/1998 | Shimakawa et al. | |
|---|---|---|---|
| 2002/0083114 A1* | 6/2002 | Mazzagatte et al. | .......... 709/100 |
| 2009/0086246 A1* | 4/2009 | Asai | ............................ 358/1.13 |

FOREIGN PATENT DOCUMENTS

| CN | 1360251 A | 7/2002 |
|---|---|---|
| CN | 1423206 A | 6/2003 |
| EP | 1217509 A2 | 6/2002 |
| JP | 2002-287932 A | 10/2002 |
| JP | 2003-195704 A | 7/2003 |
| JP | 2007-264779 A | 10/2007 |
| JP | 2009223610 A * | 10/2009 |
| JP | 2011-014996 A | 1/2011 |
| JP | 2011-035714 A | 2/2011 |

* cited by examiner

*Primary Examiner* — Thierry L Pham
(74) *Attorney, Agent, or Firm* — Canon USA, Inc., IP Division

(57) ABSTRACT

A printing apparatus includes an instruction unit configured to issue a print instruction for printing print data stored in a storage device or a print server, a determination unit configured to determine whether authentication information is included in the print data, and a printing unit configured to, when the instruction unit issues the print instruction without performing authentication operation for authenticating a user and when the determination unit determines that authentication information is included in the print data, print the print data in response to an input of the authentication information by the user, and when the instruction unit issues the print instruction after performing authentication operation for authenticating a user and when the determination unit determines that authentication information is included in the print data, print the print data without prompting the user to input authentication information.

10 Claims, 10 Drawing Sheets

FIG. 3

| ITEM NAME | SETTING VALUE |
|---|---|
| SERVER RESERVATION PRINTING FUNCTION | ENABLED/DISABLED |
| PASSWORDED PRINT JOB EXECUTION | PERMITTED/INHIBITED |
| EXCLUSIVE CONTROL BETWEEN SERVER RESERVATION PRINTING FUNCTION AND PASSWORDED PRINT JOB | ON/OFF |
| OPERATION WHEN PASSWORDED PRINT JOB EXECUTION IS INHIBITED | CANCEL PRINTING/PRINT FORCIBLY |

PROPERTIES OF PRINTER. XX03

601 — JOB TYPE: ○ REGULAR PRINTING ◉ SECURE PRINTING
602 — NUMBER OF COPIES: 5
603 — PAGE LAYOUT: 4 PAGES/SHEET ▷
604 — PAGE ARRANGEMENT: FROM TOP LEFT TO RIGHT ▷
605 — PRINTING METHOD: ○ ONE-SIDED PRINTING ◉ TWO-SIDED PRINTING ○ PRINTING WITH BOOKBINDING
606 — BINDING DIRECTION: LONG-SIDE BINDING (LEFT) ▷
607 — DISCHARGE METHOD: ○ NOT SPECIFIED ◉ SORTING ○ STAPLING
608 — SHEET FEED UNIT ◉ AUTO ○ MANUAL FEED TRAY ○ CASSETTE 1 ○ CASSETTE 2

( OK )  ( CANCEL )

FIG. 7

```
Confirm Password
DOCUMENT NAME: | DOCUMENT TO BE DELIVERED ON APRIL 1 |～701
USER NAME: | suzuki |～702
PASSWORD: | 1234567 |～703
                                              [ OK ]  [ CANCEL ]
```

FIG. 10

PRINTING APPARATUS, METHOD FOR CONTROLLING PRINTING APPARATUS, AND STORAGE MEDIUM

BACKGROUND OF THE INVENTION

1. Field of the Invention

The present invention relates to a printing apparatus which prints print data received from an external device. More particularly, the present invention relates to a printing apparatus which holds print data in a print server or the printing apparatus, and outputs a print product in response to a user operation on an operation unit of the printing apparatus.

2. Description of the Related Art

A printing system is generally known to hold in a printing apparatus or print server print data transmitted from an external device such as a personal computer (PC), and print the print data in response to a user operation performed on an operation panel of the printing apparatus. Such a printing process is generally referred to as "reservation printing."

The above-described reservation printing system is configured so as to print the print data held when a user enters a password or performs user authentication on an operation screen of the printing apparatus.

Such a system is effective particularly in a case where, for example, the printing apparatus is a shared printer connected to a network, and the print product is not intended to be seen by other people.

Reservation printing has been achieved in diverse ways by various vendors. For example, Japanese Patent Application Laid-Open No. 2003-195704 discusses a technique for attaching a password to print data by using a PC, transmitting the passworded print data to a printing apparatus, and printing the print data when a password which is the same as the one attached to the print data is entered from an operation panel of the printing apparatus. Such a reservation printing method may be referred to as secured printing, confidential printing, private print, and so on.

Another example method for achieving reservation printing is to hold print data in a print server in association with a user, perform user authentication by holding up an integrated circuit (IC) card on a printing apparatus, and in response to the user authentication, print the print data owned by the user.

As described above, with a certain reservation printing method, the print server connected to a network holds print data, and in response to a user operation on the printing apparatus, the printing apparatus receives the print data from the print server, and then prints it (this printing process is referred to as server reservation printing).

With another certain reservation printing method, the printing apparatus holds passworded print data, and in response to reception of a password input from a user on the printing apparatus, the printing apparatus prints the print data (this printing process is referred to as passworded print data printing).

If a password is attached to the print data held in the print server, two user operations are required on the printing apparatus side. One is a user authentication operation necessary to receive the print data from the print server, and the other is an operation for entering a password.

SUMMARY OF THE INVENTION

According to an aspect of the present invention, a printing apparatus includes: an instruction unit configured to issue a print instruction for printing print data stored in a storage device or a print server; a determination unit configured to determine whether authentication information is included in the print data; and a printing unit configured to, when the instruction unit issues the print instruction without performing authentication operation for authenticating a user and when the determination unit determines that authentication information is included in the print data, print the print data in response to an input of the authentication information by the user, and when the instruction unit issues the print instruction after performing authentication operation for authenticating a user and when the determination unit determines that authentication information is included in the print data, print the print data without prompting the user to input authentication information.

According to the present invention, print data held in a storage device or print server can be suitably printed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention, and together with the description, serve to explain the principles of the invention.

FIG. 3 is a table schematically illustrating setting values for defining operations of the printing apparatus.

FIG. 6 illustrates an example print setting screen displayed by a printer driver of the PC.

FIG. 7 illustrates an example screen for setting a password for a passworded print job.

FIG. 10 illustrates an example passworded print job selection screen displayed on the operation panel of the printing apparatus.

DESCRIPTION OF THE EMBODIMENTS

Various exemplary embodiments, features, and aspects of the invention will be described in detail below with reference to the drawings.

Figure 1:
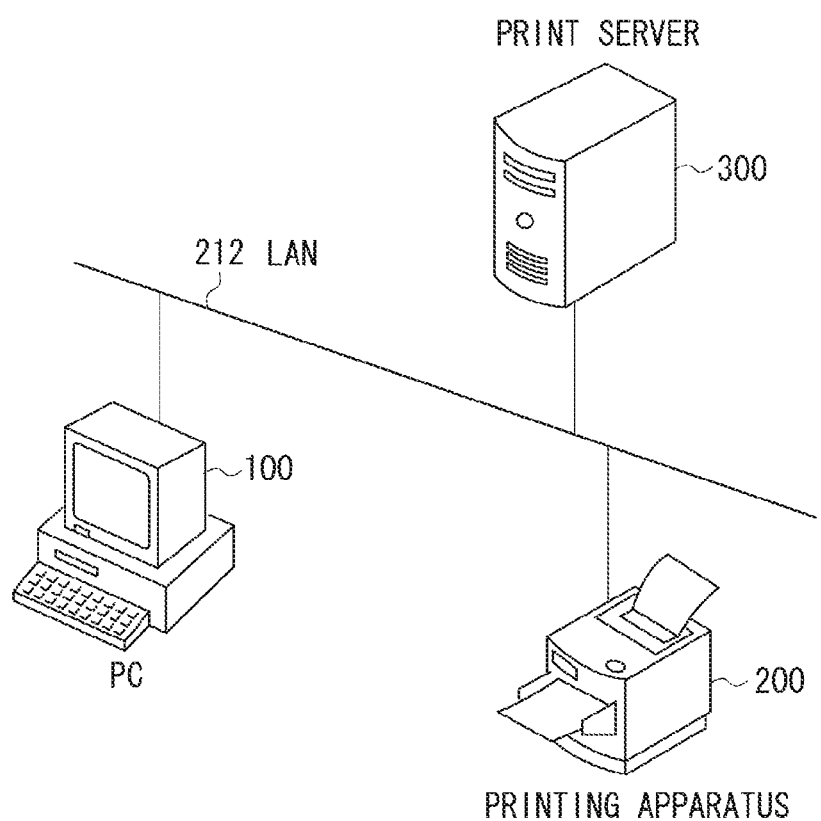
FIG. 1 illustrates a configuration of a network system including a personal computer (PC), a print server, and a printing apparatus.

FIG. 1 is a block diagram illustrating a configuration of a printing system according to an exemplary embodiment of the present invention. This printing system includes a PC 100 for transmitting print data, a print server 300 having a function of holding the print data in a predetermined storage device, and a printing apparatus 200 for receiving and printing the print data. These apparatuses are capable of transmitting and receiving data and information to/from each other via a local area network (LAN) 212.

As described above, the printing apparatus 200 is connected with the PC 100 and the print server 300 via the LAN 212 to communicate with the PC 100 and the print server 300 based on a predetermined network communication protocol, thus achieving so-called network printing function. The present exemplary embodiment will be described below on the premise that the printing apparatus 200 is a multi-functional peripheral (MFP) having not only the network printing function but also copy function. However, the printing apparatus 200 may be a single functional peripheral (SFP) having only the above-described network printing function.

The PC 100 server is an external device in which a printer driver and an application for generating an electronic document are installed. The PC 100 has a function of generating page description language (PDL) data (hereinafter also referred to as print data) via the printer driver based on an electronic document generated by the above-described application and a function of transmitting the print data to an output destination apparatus via the LAN 212.

As an output destination apparatus, the PC 100 can specify the print server 300 and the printing apparatus 200. When the print server 300 is specified, the print data is held in the storage device in the print server 300. Otherwise, when the PC 100 accepts a specification of the printing apparatus 200 as an output destination apparatus, the PC 100 transmits the print data directly to the printing apparatus 200 not via the print server 300.

The print server 300 has a function of temporarily storing the received print data in the storage device. When the print data is given a suitable identifier (ID) by the printing apparatus 200, upon reception of a request for acquiring the print data containing the ID from the printing apparatus 200, the print server 300 returns the print data to the printing apparatus 200.

Although, in the printing system illustrated in FIG. 1, only one printing apparatus 200 is connected to the LAN 212, a plurality of printing apparatuses 200 may be connected to the LAN 212. In a printing system in which a plurality of printing apparatuses 200 is connected to the LAN 212, once the PC 100 transmits print data to the print server 300, any printing apparatus 200 can output a print product.

Figure 2:
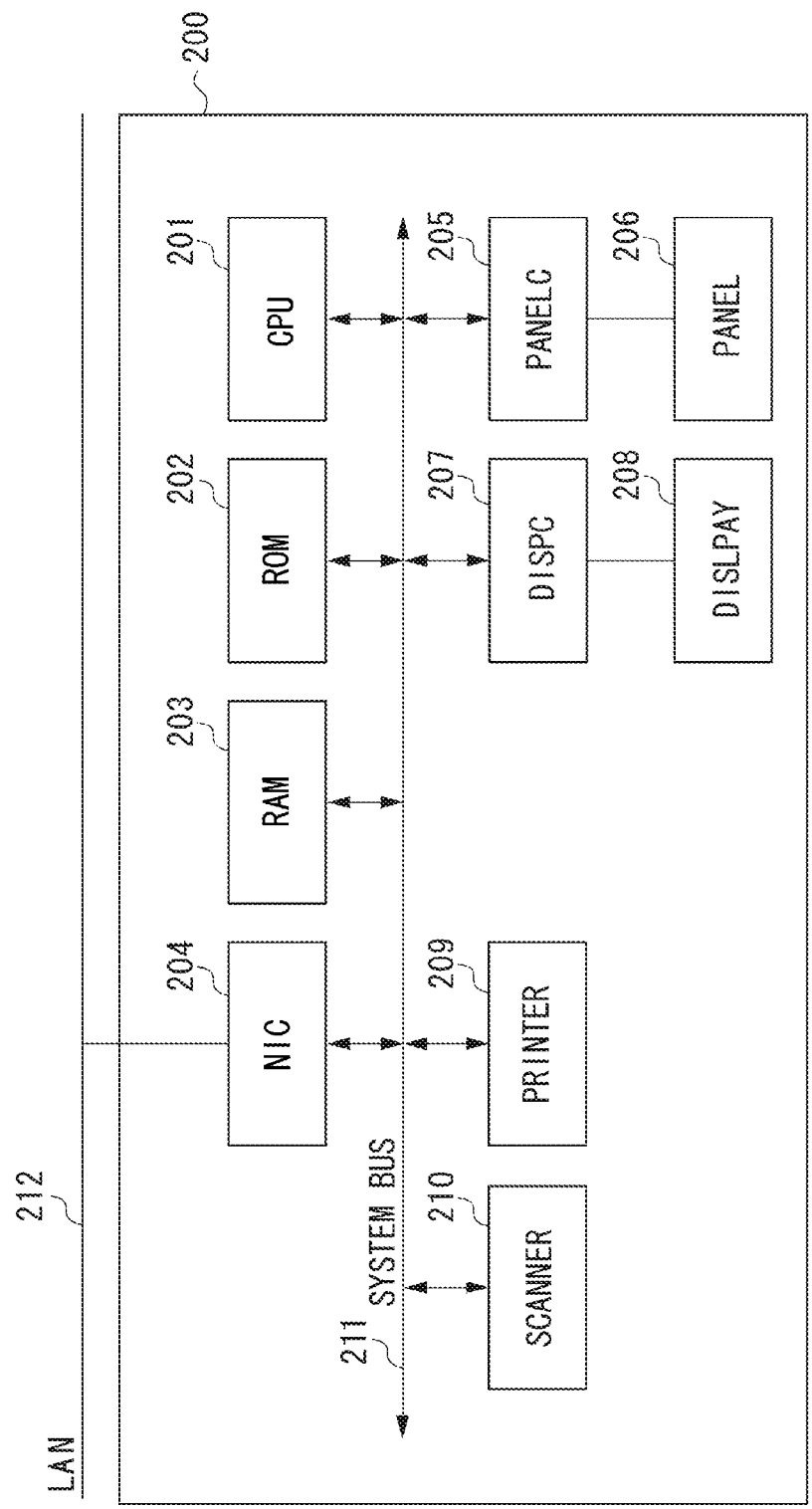
FIG. 2 is a block diagram illustrating a hardware configuration of the printing apparatus.

FIG. 2 illustrates a hardware configuration of the printing apparatus 200 illustrated in FIG. 1. A central processing unit (CPU) 201 is a processor for controlling the printing apparatus 200. A read-only memory (ROM) 202 stores program codes for controlling the CPU 201, a panel 206, a scanner 210, a printer 209, and so on.

Since the ROM 202 is a rewritable flash ROM, the program codes stored therein can be updated. A random access memory (RAM) 203 is used not only as a work memory for the above-described control program codes but also as a memory for temporarily storing an image to be printed on the printer 209.

The printer 209 performs image formation based on received image data. The scanner 210 scans a document and converts the scanned image into image data. The panel 206 includes various types of keys for accepting operations from a user, and allows the user to input instructions for executing various programs. A display 208 displays operation screens for operating functions and settings.

A network interface card (NIC) 204 is an interface for connecting the printing apparatus 200 with the LAN 212. The NIC 204 receives print data from the PC 100 and the print server 300.

FIG. 3 schematically illustrates setting values for defining operations of the printing apparatus 200 stored in the ROM 202 of the printing apparatus 200.

As illustrated in FIG. 3, the printing apparatus 200 stores various setting values such as a server reservation printing function 301, passworded print job execution 302, exclusive control 303 between the server reservation printing function and passworded print job, and an operation 304 when passworded print job execution is inhibited.

The server reservation printing function defined in the present exemplary embodiment refers to a function of holding in the storage device of the print server 300 print data transmitted from the PC 100 and receiving and printing the held print data in response to an operation from the printing apparatus 200. To enable the server reservation printing function, the present exemplary embodiment is on the premise that the printing apparatus 200 is provided with an authentication function for authenticating a user.

A passworded print job defined in the present exemplary embodiment refers to a job for printing passworded print data which is formed by attaching a password (authentication information) to print data transmitted from the PC 100. The print data for the passworded print job is temporarily stored in a specific area in the RAM 203, together with the password. Then, the print data is printed when a password which is the same as or corresponds to the one attached to the print data is entered from an operation panel of the printing apparatus 200.

An item of the server reservation printing function 301 indicates whether printing based on the print data held in the print server 300 is possible or not. When this setting value is "Enabled", the printing apparatus 200 can access the print server 300 to receive the print data from the print server 300 and then print it (i.e., the printing apparatus 200 can perform the reservation printing process by the print server 300).

On the other hand, when the setting value of the server reservation printing function 301 is "DISABLED", the printing apparatus 200 cannot access the print server 300 to receive and print the print data.

An item of the passworded print job execution 302 can specify whether the printing apparatus 200 permits execution of a passworded print job (hereinafter referred to as passworded print job execution). When the setting value of this item is "PERMITTED", the printing apparatus 200 permits passworded print job execution.

On the other hand, when the setting value of this item is "INHIBITED", passworded print job execution is inhibited and the printing apparatus 200 performs operation according to the operation 304 when passworded print job execution is inhibited (described below). In the present exemplary embodiment, the setting value of the server reservation printing function 301 and the setting value of the passworded print job execution 302 can be set independently.

An item of the exclusive control 303 between the server reservation printing function and passworded print job indicates whether passworded print job execution is inhibited or not when the server reservation printing function 301 is enabled. When this setting value is "ON" and when the server reservation printing function 301 is enabled, passworded print job execution is automatically inhibited. As a result, reservation printing usable by the printing apparatus 200 is limited to server reservation printing.

On the other hand, when this setting value is "OFF", even when the server reservation printing function 301 is enabled, passworded print job execution is permitted.

An item of the operation 304 defines an operation when passworded print job execution is inhibited. Specifically, when "INHIBITED" is set as the setting value of the passworded print job execution 302 and when "STOP PRINTING" is set as the setting value of the operation 304, the printing apparatus 200 does not perform the passworded print job and deletes the received print data.

On the other hand, when "INHIBITED" is set as the setting value of the passworded print job execution 302 and when "PRINT FORCIBLY" is set as the setting value of the operation 304, the printing apparatus 200 handles the passworded print job as a regular print job. Specifically, the printing apparatus 200 prints the received print data without waiting for a password input from the user.

When the setting value of the exclusive control 303 between the server reservation printing function and passworded print job is "ON" and when the setting value of the server reservation printing function 301 is "ENABLED", passworded print job execution is inhibited as described above. In this case, therefore, the printing apparatus 200 performs operation based on the setting value of the operation 304. Specifically, when the setting values of the exclusive control 303 between the server reservation printing function and passworded print job is "ON", when the setting value of the server reservation printing function 301 is "ENABLED," and when the setting value of the operation 304 when passworded print job execution is inhibited is "STOP PRINTING", the printing apparatus 200 cancels the received passworded print job.

On the other hand, when the setting value of the exclusive control 303 between the server reservation printing function and passworded print job is "ON", when the setting value of the server reservation printing function 301 is "ENABLED, and when the setting value of the operation 304 is "PRINT FORCIBLY", the printing apparatus 200 handles the passworded print job as a regular print job.

In the present exemplary embodiment, the setting values of the server reservation printing function 301 to the operation 304 can be suitably updated by an administrator.

Figure 4:
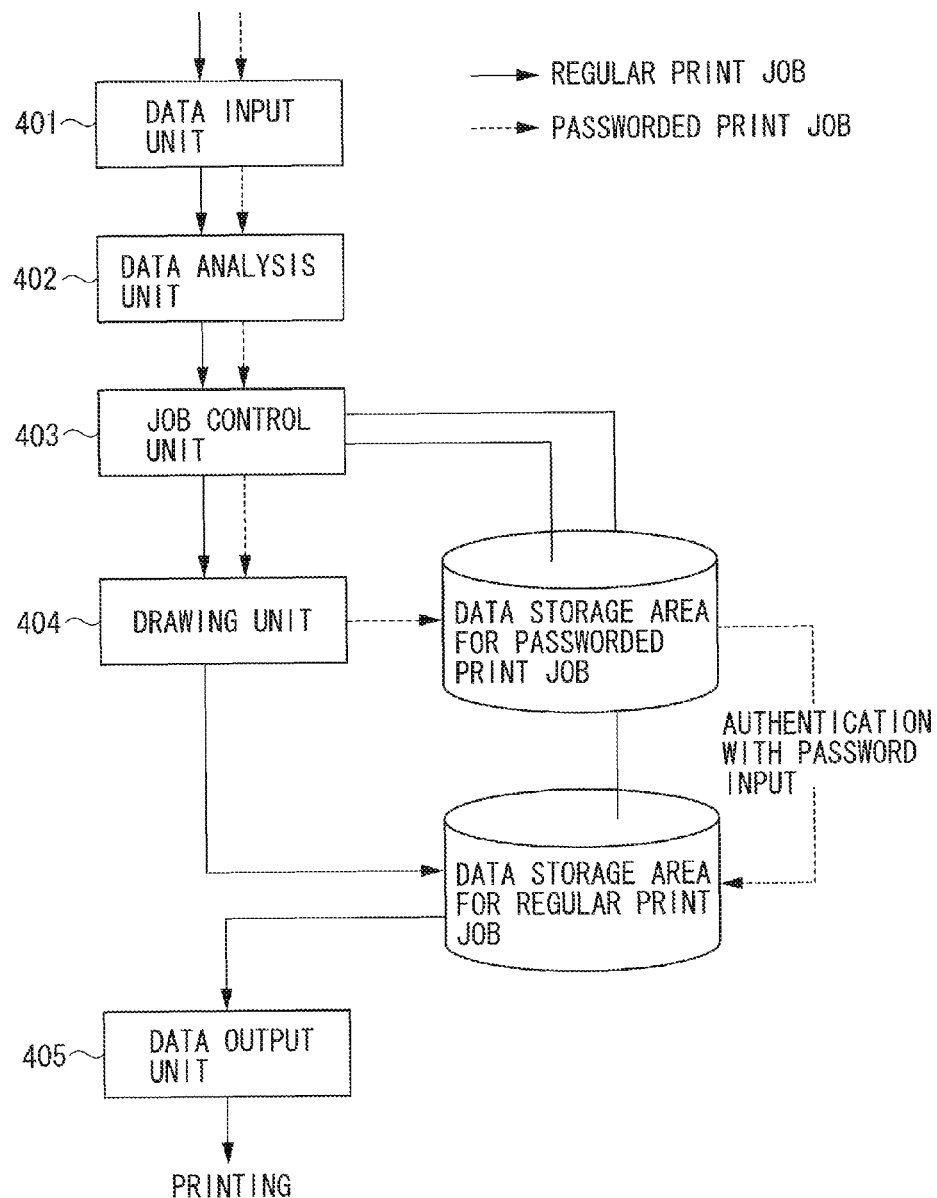
FIG. 4 is a block diagram illustrating functions of the printing apparatus.

FIG. 4 is a block diagram illustrating functions of the printing apparatus 200 illustrated in FIG. 1. A data input unit 401, a data analysis unit 402, a job control unit 403, a drawing unit 404, and a data output unit 405 illustrated in FIG. 4 are stored in the ROM 202. These units forma firmware module executed by the CPU 201.

Referring to FIG. 4, the firmware module of the printing apparatus 200 includes the data input unit 401, the data analysis unit 402, the job control unit 403, the drawing unit 404, and the data output unit 405, which are all stored in the ROM 202.

The data input unit 401 receives print data from the LAN 212 and transmits the received print data to the data analysis unit 402. Print data generated by the printer driver installed in the PC 100 or print data stored in the print server 300 is input into the printing apparatus 200 via the NIC 204.

The data analysis unit 402 analyzes the PDL data (print data) received from the data input unit 401. Specifically, the data analysis unit 402 analyzes the settings and print data set by the printer driver in the PC 100 to prepare for subsequent drawing. The job control unit 403 manages and controls jobs for each status via the data analysis unit 402, the drawing unit 404, and the data output unit 405.

The drawing unit 404 generates image data based on the result of analysis by the data analysis unit 402. The job control unit 403 stores in the RAM 203 image data drawn by the drawing unit 404. In this case, the job control unit attaches a status (execution ready state or authentication wait state) to the image data based on the result of analysis by the data analysis unit 402.

As a result of print data analysis by the data analysis unit 402, when the data analysis unit 402 determines that a print job relevant to the print data is a regular print job, the job control unit 403 attaches the execution ready state to the image data and then stores it in a regular print job data storage area in the RAM 203, and when the printer 209 becomes ready for printing, instructs the data output unit 405 to output the image data to the printer 209.

On the other hand, as a result of print data analysis by the data analysis unit 402, when the data analysis unit 402 determines that a print job relevant to the print data is a passworded print job, the job control unit 403 attaches the authentication wait state to the image data and then stores it in a passworded print job data storage area in the RAM 203.

The data output unit 405 receives the image data, feeds paper, and adjusts the print position. Then, the printer 209 prints the image data.

Figure 5:
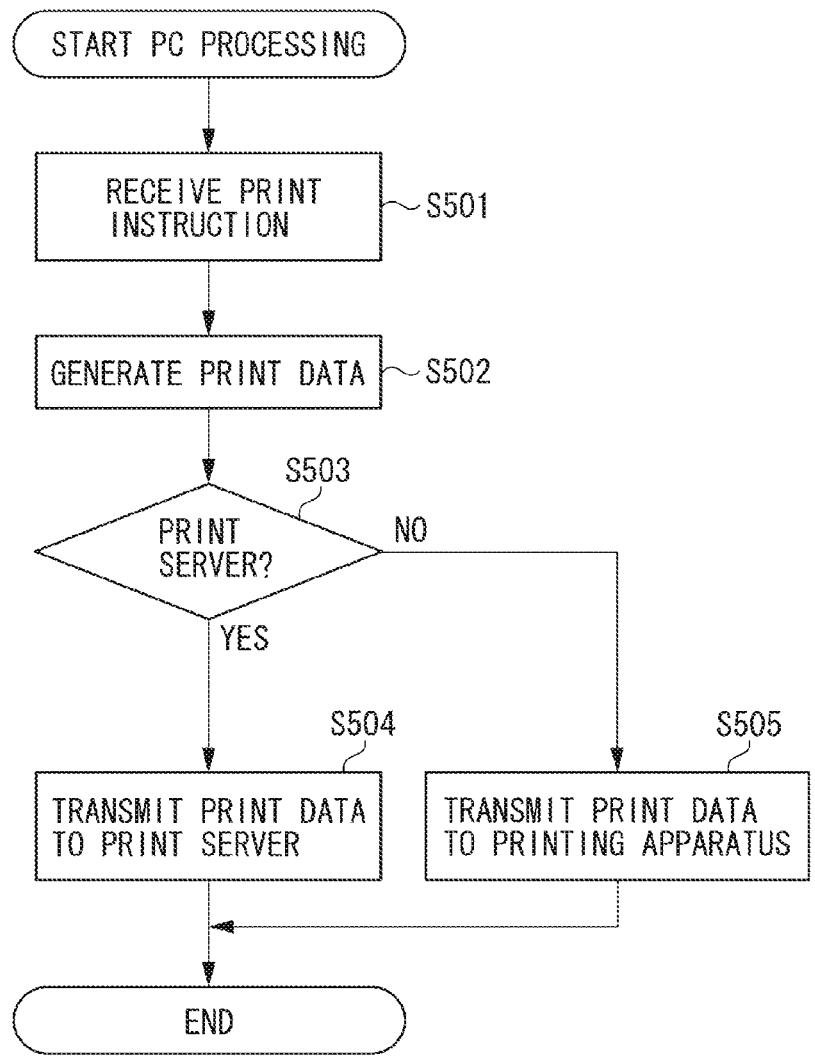
FIG. 5 is a flowchart illustrating processing performed by the PC.

FIG. 5 is a flowchart illustrating processing performed by the PC 100. Specifically, the PC 100 generates, using the printer driver of the PC 100, PDL print data based on an electronic document generated with various applications, and transmits the PDL print data to the output destination apparatus. A program code for executing each step of this flowchart is stored in a hard disk drive (not illustrated) of the PC 100, and executed by the CPU 201.

In step S501, the PC 100 receives desired printing settings from the user by using a print setting screen (see FIG. 6) displayed by the printer driver. FIG. 6 illustrates an example print setting screen displayed by the printer driver installed in the PC 100.

A job type 601 is an item for specifying a printing attribute of the job type. As the job type 601, the user can specify "REGULAR PRINTING" or "SECURE PRINTING." When "REGULAR PRINTING" is specified, a job is issued as a regular print job, and the PC 100 generates print data without password, and then transmits the print data to the printing apparatus 200 or the print server 300.

On the other hand, when "SECURE PRINTING" is specified, a job is issued as a passworded print job, and the PC 100 attaches a password to the print data as a printing attribute, and then transmits the print data to the printing apparatus 200 or the print server 300.

Although the number of copies, page layout, page arrangement, printing method, binding direction, etc. can be specified in addition to the above-described job type 601, detailed descriptions will be omitted.

FIG. 7 illustrates a setting screen which is displayed when the "SECURE PRINTING" is specified as the job type 601 displayed in the screen illustrated in FIG. 6. The setting screen illustrated in FIG. 7 is displayed by the printer driver similar to the screen in FIG. 6. In the setting screen in FIG. 7, the user sets a document name 701, a user name 702, and a password 703.

In step S502, the printer driver of the PC 100 generates print data based on the printing settings accepted via the print setting screen illustrated in FIG. 6 (FIGS. 6 and 7 when "SECURE PRINTING" is specified). Printing attributes such as user name, document name, etc. (and the password 703 when "SECURE PRINTING" is specified) are attached to the generated print data.

In step S503, the PC 100 determines whether the print server 300 is specified as an output destination apparatus. When the print server 300 is specified as an output destination apparatus (YES in step S503), the processing proceeds to step S504. In step S504, the PC 100 transmits the generated print data to the print server 300.

On the other hand, when the printing apparatus 200 is specified as an output destination apparatus (NO in step S503), the processing proceeds to step S505. In step S505, the PC 100 transmits the generated print data to the printing apparatus 200. The output destination apparatus may be specified either by selecting it in the print setting screen (see FIG. 7) displayed by the printer driver or by activating a different printer driver for each output destination apparatus.

When the print data is transmitted to the print server 300 in step S504, the print data is stored in the print server 300 in association with a user name which is attached to the print data as a printing attribute.

Figure 8:
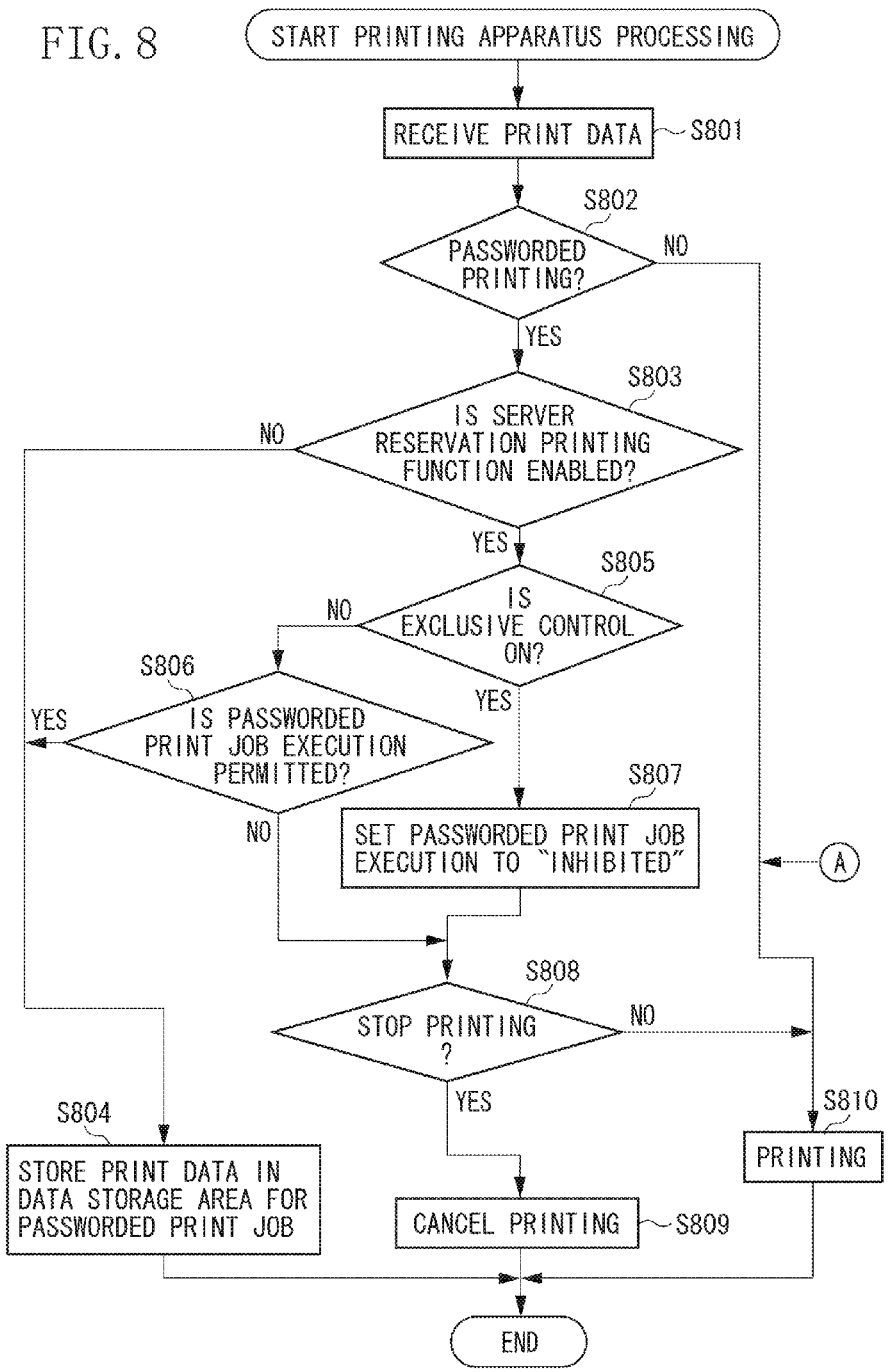
FIG. 8 is a flowchart illustrating processing performed by the printing apparatus upon reception of print data from the PC or the print server.

FIG. 8 is a flowchart illustrating processing performed by the printing apparatus 200 when the printing apparatus 200 receives print data from the PC 100 or the print server 300. A program code for executing each step of this flowchart is stored in the ROM 202 and executed by the CPU 201.

In step S801, the printing apparatus 200 receives print data from an external apparatus via the NIC 204. In this case, the printing apparatus 200 also receives printing attributes together with the print data. In step S801, the printing apparatus 200 may receive print data once held in the print server 300 or receive print data transmitted from the PC 100 without being held in the print server 300.

In step S802, the printing apparatus 200 determines whether the received print data is for a passworded print job, more specifically, whether a password (authentication information) is included in the printing attribute received together with the print data.

When the printing apparatus 200 determines that the received print data is for a passworded print job (YES in step S802), the processing proceeds to step S803. In step 803, the printing apparatus 200 reads setting values stored in the ROM 202. In step S803, the printing apparatus 200 determines whether the server reservation printing function is enabled, i.e., whether the setting value of the server reservation printing function 301 (see FIG. 3) is "ENABLED." When the setting value of the server reservation printing function 301 (see FIG. 3) is "ENABLED" (YES in step S803), the processing proceeds to S805. On the other hand, when the setting value of the server reservation printing function 301 is "DISABLED" (NO in step S803), the processing proceeds to step S804.

Although, in the present exemplary embodiment, the printing apparatus 200 makes determination referring to the setting value of the server reservation printing function 301 (see FIG. 3) in step S803, the printing apparatus 200 may make the same determination by identifying where the print data is received from.

More specifically, when the print data is received from the print server 300, the printing apparatus 200 determines that the print data was once held in the print server 300 and then received in response to a user operation on the printing apparatus 200 (YES in step S803), and the processing proceeds to step S805.

On the other hand, when the print data is received from the PC 100, the printing apparatus 200 determines that the print data was transmitted not via the print server 300 (NO in step S803), and the processing proceeds to step S804.

In step S804, based on the received print data, the printing apparatus 200 generates image data using the drawing unit 404. Then, the job control unit 403 stores the image data in the passworded print job data storage area in association with the status of the authentication wait state.

In step S805, the printing apparatus 200 reads the setting value of the exclusive control 303 between the server reservation printing function and passworded print job (see FIG. 3) and determines whether the exclusive control 303 between the server reservation printing function and passworded print job is to be performed. When the setting value of the exclusive control 303 between the server reservation printing function and passworded print job is "ON" (YES in step S805), the processing proceeds to step S807. On the other hand, when the setting value is "OFF" (NO in step S805), the processing proceeds to step S806.

In step S806, the printing apparatus 200 reads the setting value of the passworded print job execution 302 (see FIG. 3) and determines whether passworded print job execution is permitted. When the setting value of the passworded print job execution 302 indicates "PERMITTED" (YES instep S806), the processing proceeds to step S804. On the other hand, when the setting value indicates "INHIBITED" (NO in step S806), the processing proceeds to step S808.

In step S807, the printing apparatus 200 updates the setting value of the passworded print job execution 302 to "INHIBITED." This processing is not necessary if the setting value of the passworded print job execution 302 indicates "INHIBITED." The processing may skip step S807 and proceed to step S808.

In step S808, the printing apparatus 200 reads the setting value illustrated in FIG. 3 from the ROM 202, and identifies the operation when passworded print job execution is inhibited. Specifically, when the setting value of the operation 304 indicates "STOP PRINTING" (YES in step S808), the processing proceeds to step S809. In step S809, the printing apparatus 200 stops job execution and records relevant error information in a history, and deletes the received print data.

The processing proceeds to step S810 when the received print data is for a regular print job (NO in step S802). The processing also proceeds to step S810 when the received print data is for a passworded print job and when passworded print job execution is inhibited.

In step S810, the printing apparatus 200 generates image data based on the print data received in step S801, stores the image data in the regular print job data storage area in the RAM 203, and starts printing as soon as the printer 209 becomes ready for printing.

Figure 9:
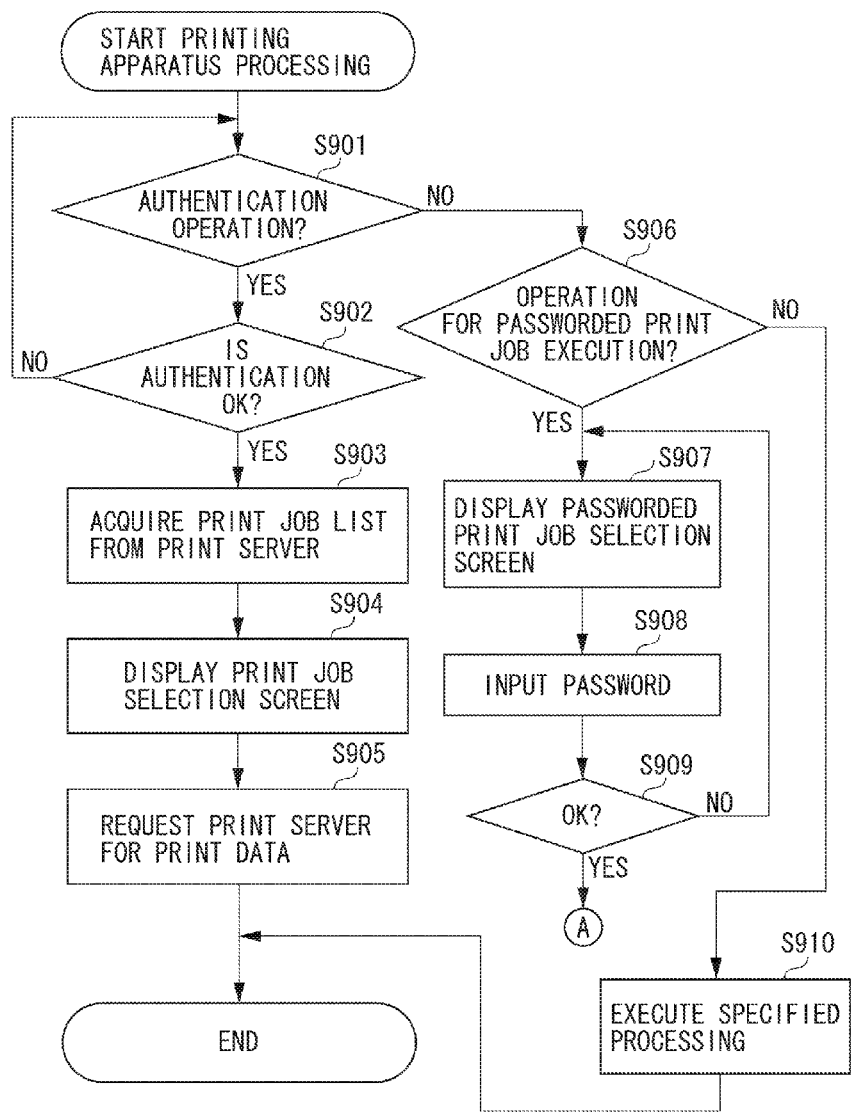
FIG. 9 is a flowchart illustrating processing performed by the printing apparatus upon reception of a user operation made on an operation panel.

FIG. 9 is a flowchart illustrating processing performed by the printing apparatus 200. The printing apparatus 200 starts the processing in the flowchart in FIG. 9 upon reception of a user operation made on the operation panel 206 of the printing apparatus 200. A program code for executing each step of this flowchart is stored in the ROM 202 and executed by the CPU 201.

In step S901, the printing apparatus 200 determines whether an authentication operation is accepted from the user. Specifically, the printing apparatus 200 detects that an IC card is read by an IC card reader (not illustrated) or that the user presses a relevant key on the operation panel 206. When the printing apparatus 200 determines that the authentication operation is received from the user (YES in step S901), the processing proceeds to step S902.

In step S902, the printing apparatus 200 displays an authentication screen (not illustrated) and receives an ID for authentication from the user. An ID for authentication may be received either by receiving an ID input from the user via the operation panel 206 or by reading user identification information stored in the IC card by using the IC card reader. Further, the user identification information may be acquired by using a magnetic card authentication method and biometric authentication method.

Then, the printing apparatus 200 authenticates a user based on an ID received via the authentication screen. Specifically, based on a user authentication database stored in the printing apparatus 200, the printing apparatus 200 authenticates whether the user identified by the user identification information is a user permitted to use the printing apparatus 200. When the printing apparatus 200 determines that the user is permitted to use it (YES in step S902), i.e., authentication is "OK", the processing proceeds to step S903. When the printing apparatus 200 determines that the user is not permitted to use it (NO in step S902), i.e., authentication is "NG", the printing apparatus 200 displays a screen indicating that authentication failed, and the processing returns to step S901.

When authentication is OK (YES in step S902), the processing proceeds to step S903. In step S903, the printing apparatus 200 performs connection processing to the print server 300 to acquire a list of information about the print data associated with the ID of the authenticated user held in a print queue of the print server 300.

At this time, the printing apparatus 200 does not actually acquire the print data from the print server 300. It acquires a list of printing attributes of the print data, such as a print data file name (document name), color/gray scale/monochrome, number of print pages, number of copies, file format, printing fee, and so on. In step S904, the printing apparatus 200 displays a list of acquired print jobs on the display 208.

In step S905, the printing apparatus 200 receives a print job selected by the user from the list displayed on the display 208. Then, the printing apparatus 200 transmits to the print server 300 an instruction for printing the print data of the selected print job. When the print server 300 receives the print job selection, it transmits to the printing apparatus 200 the print data of the print job included in the print instruction.

In step S906, the printing apparatus 200 determines whether an operation (print instruction) for printing the print data held in the printing apparatus 200 is received from the user. When the printing apparatus 200 determines that the print instruction is received (YES in step S906), the processing proceeds to step S907. In step S907, the printing apparatus 200 displays on the display 208 a passworded print job selection screen for the passworded print jobs stored in the RAM 203 of the printing apparatus 200.

Figure 10:
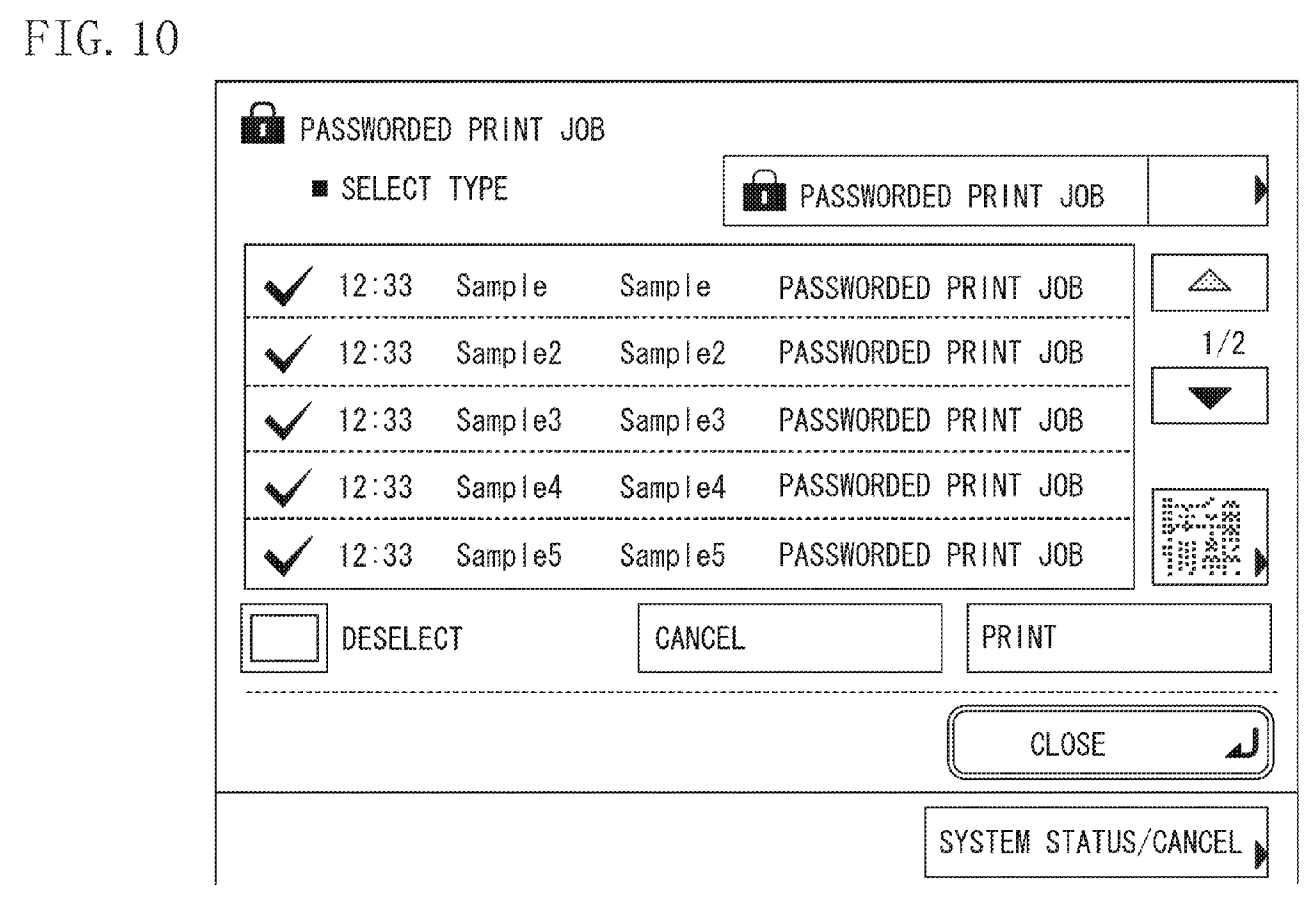

FIG. 10 illustrates an example passworded print job selection screen. This selection screen displays a list of data, to which the authentication wait state is attached by the job control unit 403, stored in the passworded print job data storage area in the RAM 203. When the printing apparatus 200 receives a print job selected from this selection screen by the user, the processing proceeds to step S908. In step S908, the printing apparatus 200 displays a password input screen to prompt the user to input a password.

In step S909, the printing apparatus 200 determines whether the input password coincides with the password attached to the image data. When the input password coincides with the password attached to the image data (YES in step S909), the job control unit 403 moves the image data of the relevant print job from the passworded print job data storage area to the regular print job data storage area, and the processing proceeds to step 810 illustrated in FIG. 8.

The processing proceeds to step S910 when the printing apparatus 200 determines in step S906 that an operation other than reservation printing operation (for example, copy processing, facsimile processing, scanning and transmitting processing, etc.) is accepted from the user via the panel 206. When the above-described operation is accepted from the user via the panel 206, the printing apparatus 200 performs processing according to the operation, and stores a history about the performed processing.

As described above, the present exemplary embodiment enables configuring a system capable of using both a reservation printing method for printing the print data held in the print server 300 and a reservation printing method for printing the print data held in the printing apparatus 200.

Further, in order to print the print data held in the print server 300, the server reservation printing function according to the present exemplary embodiment enables authenticating a user and acquiring from any apparatus the print data associated with the authenticated user. As a result, a print product can be output from any location without being seen by other people.

According to the present exemplary embodiment, when the server reservation printing function is enabled, passworded print job execution is restricted (see steps S802 to S810). This configuration prevents data from being held again in the printing apparatus 200 after completion of authentication processing.

In other words, the configuration prevents the authenticated user from having to input a password again, thus preventing an operation time for user authentication from increasing.

As a method of restricting passworded print job, the present exemplary embodiment enables the user to select whether a passworded print job is to be executed as a regular print job or execution of the job is to be canceled (see steps S808 to S810). As a result, when the server reservation printing function is enabled and a passworded print job is entered, the user can select an operation from a plurality of candidates.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-153891 filed Jul. 12, 2011, which is hereby incorporated by reference herein in its entirety.

What is claimed is:

1. A printing apparatus connectable to a server, the apparatus comprising:
a printing unit configured to print data;
a setting unit configured to set information indicative of a server reservation printing function and indicative of an exclusive control function; and
a control unit configured to, in a case where the server reservation printing function is enabled in accordance with the information set by the setting unit, obtain data of a user from the server after the user is authenticated, the obtained data being printed by the printing unit,
wherein the control unit is configured to prompt the user to input a password at the start of printing if a password print function is enabled and not to prompt the user to input a password at the start of printing if the password print function is disabled, and
wherein the control unit is configured to perform control so that: (i) the password print function is disabled in a case where the server reservation printing function and the exclusive control function both are enabled in accordance with the information set by the setting unit, and
(ii) the password print function remains enabled in a case where the server reservation printing function is enabled and the exclusive control function is disabled.

2. The printing apparatus according to claim 1, wherein when the password print function is disabled, the control unit controls the printing unit to print the data without prompting the user to input a password.

3. The printing apparatus according to claim 1, wherein when an authentication operation for authenticating a user is performed, the printing unit prints data associated with the authenticated user.

4. The printing apparatus according to claim 1, further comprising:
   an instruction unit configured to issue a print instruction for printing data stored in a storage device or the server; and
   a display unit configured to display identification information of data,
   wherein the instruction unit issues the print instruction for printing data which is selected from the identification information displayed by the display unit.

5. The printing apparatus according to claim 4, wherein the display unit displays a file name of the data and a printing attribute of the data.

6. The printing apparatus according to claim 4, wherein when an authentication operation for authenticating a user is performed, the display unit displays identification information of data associated with the authenticated user.

7. The printing apparatus according to claim 4, wherein the storage device is provided in the printing apparatus.

8. A method of controlling a printing apparatus connectable to a server, the method comprising:
   in a case where information indicative of a server reservation printing function and of an exclusive control function is set and the server reservation printing function is enabled in accordance with the set information,
      obtaining data of a user from the server after the user is authenticated, and
      controlling the printing apparatus to print the data obtained from the server;
   in a case where a password print function is enabled,
      prompting the user to input a password at the start of printing; and
   in a case where the password print function is disabled,
      not prompting the user to input a password at the start of printing,
   wherein the password print function is disabled in a case where the server reservation printing function and the exclusive control function both are enabled in accordance with the set information, and the password print function remains enabled in a case where the server reservation printing function is enabled and the exclusive control function is disabled.

9. A non-transitory computer-readable storage medium storing a program, which, when executed by a computer, causes the computer to perform a method comprising:
   in a case where information indicative of a server reservation printing function and of an exclusive control function is set and the server reservation printing function is enabled in accordance with the set information,
      obtaining data of a user from a server after the user is authenticated, and
      controlling a printing apparatus, connectable to the server, to print the data obtained from the server;
   in a case where a password print function is enabled,
      prompting the user to input a password at the start of printing; and
   in a case where the password print function is disabled,
      not prompting the user to input a password at the start of printing,
   wherein the password print function is disabled in a case where the server reservation printing function and the exclusive control function both are enabled in accordance with the set information, and the password print function remains enabled in a case where the server reservation printing function is enabled and the exclusive control function is disabled.

10. The printing apparatus according to claim 4, wherein the identification information displayed by the display unit comprises a passworded print job selection screen including one or more passworded print jobs displayed by the display unit, and wherein, after a passworded print job is selected from the one or more passworded print jobs, a password input screen is displayed to prompt the user to input the password before printing begins.

* * * * *